INVENTOR.
THEODORE A. CAMPBELL
BY Fulwider, Patton, Rieber
Lee, and Utecht
ATTORNEYS

United States Patent Office 3,304,772
Patented Feb. 21, 1967

3,304,772
TORQUE WRENCH
Theodore A. Campbell, Newport Beach, Calif.
(3113 W. Burbank Blvd., Burbank, Calif. 91505)
Filed Oct. 30, 1963, Ser. No. 322,272
9 Claims. (Cl. 73—139)

This invention relates generally to torque wrenches, and more particularly to a new and improved torque wrench capable of accurately torquing over an extended range including very low as well as very high values of torque.

In the mechanical arts, it has been a common practice to use torque wrenches for tightening nuts and bolts to various torque specifications during assembly procedures and the like, e.g., as in the automotive and aircraft industries. Since such operations may involve widely divergent torquing requirements, i.e., some nuts and bolts may call for torquing to only a few inch-pounds while others may call for torquing to several hundred inch-pounds, the usual practice has been to supply a plurality of separate torque wrenches, each wrench being capable of accurately torquing over a narrow design range of torque values. Thus, if during an assembly procedure a worker encounters a nut or bolt which is to be torqued, let us say, to thrity inch-pounds, he would use a torque wrench having a range which accurately indicates this value of torque, whereas if the worker then encounters a nut or bolt which requires torquing to, let us say, 720 inch-pounds (60 foot-pounds), he would have to change to a higher range wrench capable of accurately indicating the latter value of applied torque.

Of course, any torque wrench which can apply 60 foot-pounds of torque to a nut or bolt is inherently also capable of supplying any lesser value of torque, such as 30 inch-pounds, to a nut or bolt. However, the torque wrenches of the prior art heretofore available have not generally been capable of accurately indicating low values of torque when designed for accurate indication of higher values of torque, and vice versa. The reason for this has been that a scale capable of accurately indicating torque differences in the high torque range usually calls for too small a scale displacement between low values of torque to accurately measure such low torque values. On the other hand, if a low range torque wrench is used to apply a torque in excess of its design range, the value of the applied torque cannot usually be read because it is off scale. Hence, such torque wrenches are relatively useless outside of their respective design ranges in applications calling for precision torquing, and use of such torque wrenches outside of their specified ranges is likely to result in over-torquing or under-torquing.

For the foregoing reasons, and as previously indicated, resort has had to be made to providing groups of torque wrenches wherein each wrench is designed to accurately span only a narrow torque range. This need for a plurality of wrenches means additional costs insofar as the purchase and storage of tools is concerned. Moreover, since a single assembly procedure may call for widely variant torque values, the inconvenience and loss of time atendant upon the frequent need for selection of proper torque ranges and changing from one torque wrench to another also increases labor costs. Hence, workers in the mechanical arts have long recognized the need for an improved torque wrench capable of precision torquing over an extended range including both high and low values of torque. The present invention fulfills this need.

Accordingly, it is an object of the present invention to provide a new and improved torque wrench which overcomes the above and other disadvantages of the prior art.

Another object is to provide a new and improved torque wrench capable of accurately torquing over an extremely wide range including both high and low values of torque.

A further object of this invention is the provision of a new and improved torque wrench having two distinct and overlapping torque ranges, one range being for relatively low values of torque, the other range being for relatively high values of torque.

Still another object is to provide a new and improved torque wrench wherein a pair of springs cooperate to provide an extended, dual range of accurately indicated torque values of both high and low magnitudes.

The above and other objects and advantages of this invention will become apparent from the following description when taken in conjunction with the accompanying drawings of an illustrative embodiment thereof, and wherein.

Figure 1:
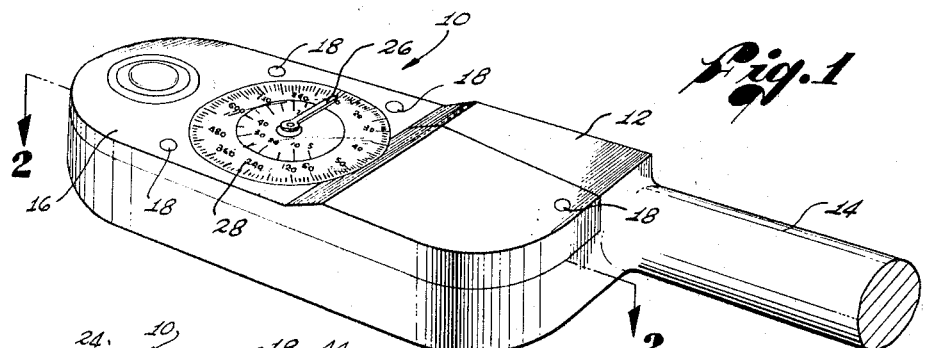
FIGURE 1 is a perspective view of a dual range torque wrench in accordance with the present invention, the overlapping yet distince high and low torque ranegs being evident from the face of the indicating dial.
Figure 3:
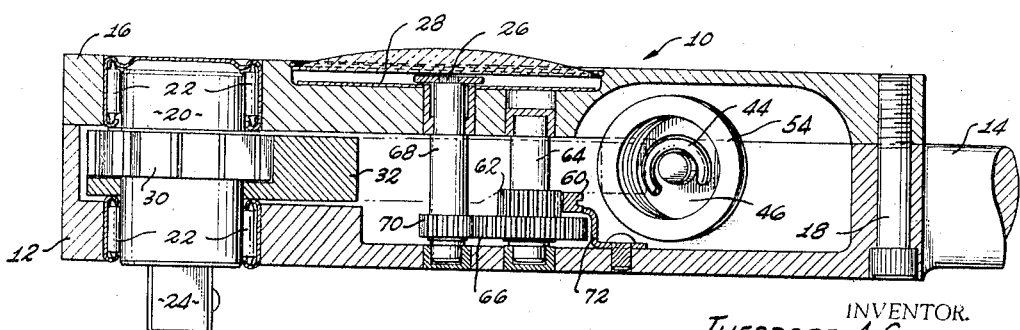
FIGURE 3 is a sectional view, taken along the line 3—3 in FIGURE 2.

Referring now to the drawings, and particularly to FIGURES 1 and 3 thereof, the torque wrench 10 of the present invention includes a housing 12 having an integral handle 14 extending from one end of the housing. The housing is normally covered to shield internal components by a cover 16 secured in place by any appropriate fastening means, as by a plurality of attachment bolts 18 or the like.

A tool post 20 is journalled for rotation, via a plurality of roller bearings 22, within the housing 12 and cover 16. A square drive post 24 is integral with the tool post 20 at the lower end thereof and projects beyond the outer surface of the housing 12, the drive post being adapted to releasably engage a wrench socket or the like (not shown) of appropriate size so that torques may be applied by the wrench 10 to any specified nut or bolt.

As will be apparent in FIGURES 1 and 3, the torque wrench 10 has a torque indicator dial including an indicator arm 26 and a dial face 28. The dial face 28 is calibrated in both inch-pounds (outer scale) and foot-pounds (inner scale) and is divided into two distinct and overlapping ranges (see FIGURE 1). In this connection, the first 30%–40% of the dial face 28 is calibrated for the low torque range from 10–60 inch-pounds, whereas the remaining portion of the dial face is calibrated for a higher torque range extending from 60 to approximately 900 inch-pounds of torque.

Figure 2:
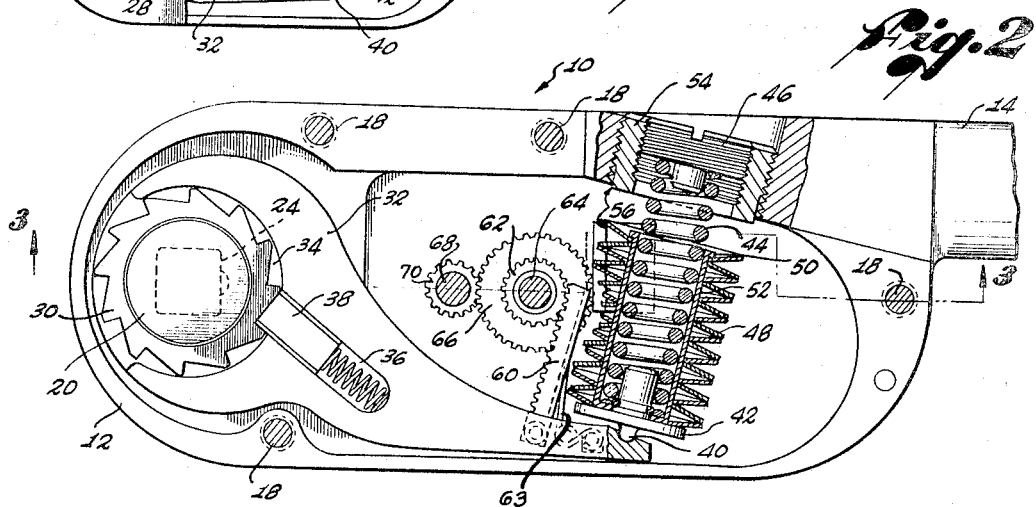
FIGURE 2 is an enlarged sectional view, taken along the line 2—2 in FIGURE 1, and illustrates the orientation of internal structural components of the torque wrench for the low torque range.

Referring now more particularly to FIGURES 2 and 3, the tool post 20 has an integral ratchet wheel 30 within the housing 12. Also within the housing 12, is a torque arm 32. The torque arm 32 is provided with an aperture through which the tool post 20 extends in sliding engagement, and the torque arm also embodies a clearance recess 34 adapted to receive the ratchet wheel 30 of the tool post. In this manner, the torque arm 32 is journalled for rotation about the tool post 20. On its upper face, the torque arm 32 is formed with an elongated cavity 36 which houses a spring biased reciprocating pawl 38, the latter cooperating with the ratchet wheel 30 to permit rotation of the tool post 20 only in a single direction, in the usual manner of operation of conventional ratchet wrenches.

The end of the torque arm 32 remote from the tool post 20 is in rocking engagement at 40 with the nipple of a platform disc 42. A coil spring 44 is supported in a compressed state between the inside face of an adjustment nut 46 at one side of the housing 12 and the side of the platform disc 42 opposite that in abutment with the torque arm 32. The spring 44 thus biases the platform disc 42 into engagement with the torque arm 32 at the rocking connection 40, and the degree of compression of the spring 44, and hence the magnitude of the biasing force, can be adjusted by rotation of the adjustment nut 46.

Surrounding the coil spring 28 and coaxial therewith is a stack of Belleville springs 48 (dished washer elements arranged so that the curvature of each element opposes the curvature of each adjacent element). One end of the stack of Belleville springs 48 is in abutment with the platform disc 42, while the other end is engaged at its inner periphery by an outwardly flaring lip 50 extending from a coaxial sleeve 52 surrounding the coil spring 44, the lower end wall of the sleeve being held against the platform disc by the lower end of the latter spring. Hence, the sleeve 52 holds the stack of Belleville springs together and, at the same time, holds one end of the stack in abutment with the platform disc 42.

The spring coefficient of the stack of Belleville springs 48 is much higher than the spring coefficient of the coil spring 44. Hence, the coil spring 44 is intended to bias the torque arm 32 for torque indications over a relatively low range of torque values, e.g., 10–60 inch-pounds, whereas the Belleville springs 48 are intended to bias the torque arm 42 for indications over a higher torque range, e.g., 5–75 foot-pounds.

Figure 4:
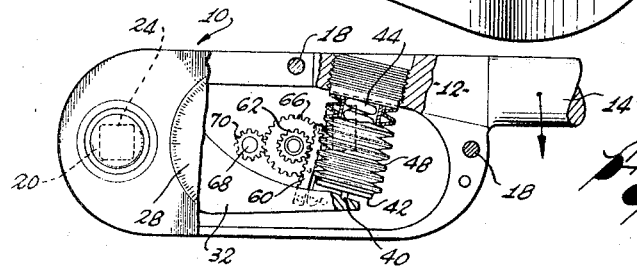
FIGURE 4 is a reduced scale, fragmentary sectional view similar to FIGURE 2, but showing the arrangement of internal components of the torque wrench when the wrench is being used over its high torque range.

As best observed in FIG. 2, the adjustment nut 46 for the coil spring 44 rotates within a second and larger adjustment nut 54 in the side of the wrench housing 12. Rotation of the adjustment nut 54 varies the size of the gap 56 between the inner end of the adjustment nut 54 and the adjacent end of the stack of Belleville springs 48. Hence, in calibrating the torque wrench 10, the adjustment nut 54 is set so that, when the wrench is in use, the gap 56 will close to zero at exactly the point where the low torque range overlaps the high torque range, e.g., at 60 inch-pounds or 5 foot-pounds on the dial face 28 in FIGURE 1. Compression of the Belleville springs 48 then proceeds as illustrated in FIGURE 4.

The manner in which rotational displacement of the torque arm 32 about the vertical axis of the tool post 20 is transmitted to the indicator arm 26 of the torque wrench dial will be apparent in FIGURES 2 and 3. A gear rack 60 has one end pivotally mounted to the end of the torque arm 32 adjacent the platform disc 42. The rack 60 is constantly biased into driving engagement with a pinion gear 62 by means of a leaf spring 63 or the like carried upon the torque arm 32. Hence, any pivotal movement of the torque arm 32 is transmitted via the rack 60 to the pinion 62.

The pinion gear 62 is affixed to a coaxial shaft 64 which is journalled for rotation within the wrench housing 12. Integral with the shaft 64 and rotatably driven therewith is a large spur gear 66 which, in turn, drives a dial actuator spindle 68 through a smaller spur gear 70 integral with the spindle at the lower end thereof. The actuator spindle 68 is, in turn, coupled to the indicator arm 26 of the torque wrench dial and, hence, rotates the indicator arm in direct proportion to the rotational displacement of the torque arm 32 transmitted through the gear train consisting of the rack 60 and gears 62, 66 and 70.

In order to prevent the shaft 64 from shifting vertically and thereby misaligning the gears 66 and 70, a retaining clip 72 is secured within the wrench housing 12 to limit the vertical displacement of the gear 66 (see FIGURE 3).

In operation, when the handle 14 of the torque wrench 10 is moved in the counterclockwise direction in FIGURES 1, 2 or 4, the wrench as a whole rotates freely with respect to the tool post 20, since the pawl 38 is biased out of locking engagement with the ratchet wheel 30. However, when the handle 14 is moved to drive the tool post 20 in the clockwise direction for applying torque to the tool post, the pawl 38 is biased into locking engagement with the ratchet wheel 30, so that there can be no relative movement between the tool post 20 and the torque arm 32. Continued movement of the handle 14 in the clockwise direction causes the torque arm 32 to pivot with the tool post 20 about the common axis thereof, by overcoming the biasing forces of the coil spring 44. As illustrated in FIGURE 2, the coil spring 44 is alone controlling during the low torque range up to 60 inch-pounds. As the spring 44 is compressed, however, the gap 56 between the stack of Belleville springs 48 and adjustment nut 54 gradually closes and diminishes to zero when the Belleville springs engage the inner face of the adjustment nut 54. The latter marks initiation of the higher torque range (60 inch-pounds and up), and the Belleville springs 48 are essentially controlling beyond this point, the coil spring 44 being virtually ineffective in view of its much lower spring coefficient.

Hence, the new and improved torque wrench of the present invention utilizes, within a single wrench housing, a pair of springs cooperating to provide a pair of distinct and overlapping torque ranges capable of accurately indicating both high and low torque values on a single scale. In this connection, the present invention satisfies a long-existing need in the mechanical arts for such an improved device.

It will be apparent from the foregoing that, while a particular form of my invention has been illustrated and described, various modifications can be made without departing from the spirit and scope of my invention. Accordingly, I do not intend that my invention be limited, except as by the appended claims.

I claim:
1. In a torque wrench, the arrangement comprising:
a tool post;
a torque arm coupled to said tool post for rotation therewith about a specified axis;
a first spring resisting rotation of said arm about said axis;
and a second spring concentric with said first spring and adapted to resist rotation of said arm about said axis after said first spring has been compressed to a predetermined degree.

2. Apparatus as set forth in claim 1, wherein said second spring has a spring coefficient greater than the spring coefficient of said first spring.

3. Apparatus as set forth in claim 1, wherein said first spring is a coil spring and said second spring is a stack of dished washer elements, the curvature of each washer element in said stack opposing the curvature of each adjacent element in said stack.

4. Apparatus as set forth in claim 1, including means for indicating the rotational displacement of said torque arm about said axis.

5. In a torque wrench, the combination comprising:
a housing;
a tool post journalled for rotation within said housing;
a torque arm within said housing and coupled to said tool post for rotation therewith only in a specified direction;
first and second concentric springs within said housing at one end of said torque arm for resisting rotation of said arm and said tool post in said specified direction, said first spring being in the form of a coil spring, said second spring being in the form of a stack of Belleville springs surrounding said first spring, said second spring having a spring coefficient greater than said first spring;

means within said housing for delaying application of the biasing force of said second spring against said torque arm until the biasing force applied to said torque arm by said first spring reaches a predetermined magnitude;

and indicator means responsive to rotational displacement of said torque arm in said specified direction.

6. A torque wrench, comprising:

a rotatable tool post;

a torque arm;

ratchet means at one end of said torque arm and coupling said torque arm to said tool post for rotation therewith in a predetermined direction only;

coil spring means at the other end of said torque arm for resisting rotation of said torque arm in said predetermined direction;

Belleville spring means for resisting rotation of said torque arm in said predetermined direction;

variable means for delaying application of the biasing forces of said Belleville spring means to said torque arm until said coil spring means has been compressed to a predetermined degree;

indicator means for indicating the torque applied to said torque arm and said tool post;

and gear means coupled between said indicator means and said torque arm for transmitting rotational displacement of said torque arm to said indicator means.

7. In a torque wrench, the combination comprising:

a housing;

a tool post journalled for rotation within said housing;

a torque arm within said housing;

a ratchet wheel integral with said tool post;

spring biased pawl means housed within said torque arm for releasably coupling said torque arm to said tool post for rotation therewith only in a specified direction;

coil spring means at the end of said tool arm remote from said tool post for resisting rotation of said torque arm and said tool post in said specified direction;

first adjustment means for varying the initial state of compression of said coil spring prior to any rotational displacement of said torque arm;

Belleville spring means surrounding said coil spring and coaxial therewith;

second adjustment means for varying the degree of compression of said coil spring necessary to initiate compression of said Belleville spring means;

indicating means for indicating torque in two distinct and overlapping torque ranges;

a gear rack coupled to said torque arm for movement therewith;

and gear means driven by said gear rack for driving said indicating means, whereby rotational displacement of said torque arm in said specified direction is translated into a torque indication by said indicator means.

8. A combination as set forth in claim 7, wherein said second adjustment means is a relatively large rotatable nut at one side of said housing, and said first adjustment means is a smaller rotatable nut within said relatively large nut.

9. A torque wrench, comprising:

a housing;

a tool post journalled for rotation within said housing;

a torque arm within said housing;

ratchet means for coupling said torque arm to said tool post for rotation therewith only in a specified direction;

a platform disc in engagement with said torque arm at the end of said arm remote from said tool post;

a coil spring having one end in abutment with the opposite side of said platform disc and having its other end in abutment with a first adjustment nut for varying the initial state of compression of said coil spring, whereby said coil spring resists rotation of said torque arm and said tool post in said specified direction;

Belleville spring means surrounding said coil spring and concentric therewith, one end of said Belleville spring means abutting the same side of said platform disc abutted by said coil spring;

a sleeve concentric with said coil spring and said Belleville spring means and positioned between said coil spring and said Belleville spring means, said sleeve having one end held in engagement with said platform disc by said coil spring and having a lip at its end remote from that in engagement with said platform disc, said lip engaging said Belleville spring means to hold said Belleville spring means together and in abutment with said platform disc;

a second adjustment nut surrounding said first adjustment nut, said second adjustment nut being capable of rotation to vary the gap between one of its faces and the nearest adjacent end of said Belleville spring means, said face of said second adjustment nut being adapted to compress said Belleville spring means when said coil spring has been sufficiently compressed to bring said face into abutment with said Belleville spring means;

indicating means for indicating torque in two distinct and overlapping ranges;

a gear rack pivotally mounted by one end to said torque arm for movement therewith;

and gear means driven by said gear rack for driving said indicating means, whereby rotational displacement of said torque arm in said specified direction is translated into a torque indication by said indicating means.

References Cited by the Examiner

UNITED STATES PATENTS

| | | | |
|---|---|---|---|
| 1,894,648 | 1/1933 | Wahl | 73—397 |
| 2,016,586 | 10/1935 | Becker | 73—397 |
| 2,057,576 | 10/1936 | Johnson | 73—397 |
| 2,183,633 | 12/1939 | Zimmerman | 73—139 |

RICHARD C. QUEISSER, *Primary Examiner.*

C. A. RUEHL, *Assistant Examiner.*